(12) United States Patent
Brooks et al.

(10) Patent No.: US 10,344,885 B2
(45) Date of Patent: Jul. 9, 2019

(54) HYDRAULIC SERVOVALVES

(71) Applicant: Moog Controls Limited, Tewkesbury, Gloucestershire (GB)

(72) Inventors: Ian Brooks, Hucclecote (GB); Christopher Pagett, Stourport on Seven (GB); Paul Guerrier, Tewkesbury (GB)

(73) Assignee: Moog Controls Limited, Tewkesbury (GB)

( * ) Notice: Subject to any disclaimer, the term of this patent is extended or adjusted under 35 U.S.C. 154(b) by 0 days.

(21) Appl. No.: 14/907,833

(22) PCT Filed: Jul. 3, 2014

(86) PCT No.: PCT/GB2014/052034
§ 371 (c)(1),
(2) Date: Jan. 27, 2016

(87) PCT Pub. No.: WO2015/015154
PCT Pub. Date: Feb. 5, 2015

(65) Prior Publication Data
US 2016/0161013 A1    Jun. 9, 2016

(30) Foreign Application Priority Data

Aug. 1, 2013 (GB) .................................. 1313804.5

(51) Int. Cl.
*F16K 31/12* (2006.01)
*F15B 13/043* (2006.01)
*F16K 31/00* (2006.01)

(52) U.S. Cl.
CPC .......... *F16K 31/004* (2013.01); *F15B 13/043* (2013.01); *F15B 13/0435* (2013.01); *F16K 31/005* (2013.01); *F16K 31/12* (2013.01)

(58) Field of Classification Search
CPC .... F16K 31/004; F16K 31/005; F16K 31/006; F16K 31/426; F16K 31/12; F16K 31/124; F16K 31/1245; F15B 13/043; F15B 13/0435
USPC ....................................... 251/129.06, 129.18
See application file for complete search history.

(56) References Cited

U.S. PATENT DOCUMENTS

| | | | |
|---|---|---|---|
| 3,152,612 A * | 10/1964 | Avery ................... | F16K 31/006 137/625.4 |
| 3,368,791 A * | 2/1968 | Wells .................. | F16K 31/0655 251/129.07 |
| 3,524,474 A * | 8/1970 | McCormick .......... | F15B 13/043 137/625.61 |
| 3,561,488 A * | 2/1971 | Byers ...................... | B62D 5/09 137/625.62 |
| 3,742,980 A * | 7/1973 | Byers, Jr. .............. | E02F 9/2228 137/625.62 |

(Continued)

FOREIGN PATENT DOCUMENTS

| | | | |
|---|---|---|---|
| EP | 0128003 A2 | 12/1984 | |
| EP | 1357321 A1 * | 10/2003 | ........... F16K 31/005 |

(Continued)

*Primary Examiner* — Robert K Arundale
*Assistant Examiner* — Jonathan J Waddy
(74) *Attorney, Agent, or Firm* — Hodgson Russ LLP (57) ABSTRACT

A servovalve has a pilot stage having a piezoelectric element actuating a pilot stage spool valve, which pilot stage spool valve comprises an output control fluid line to a main stage.

19 Claims, 7 Drawing Sheets

(56) References Cited

U.S. PATENT DOCUMENTS

| | | | | |
|---|---|---|---|---|
| 3,742,981 A * | 7/1973 | Byers | ................ | F15B 13/0416 137/625.63 |
| 4,094,229 A * | 6/1978 | Leonard | .................... | F15B 9/08 60/445 |
| 4,145,956 A | 3/1979 | Rumrill, Jr. et al. | | |
| 4,705,059 A * | 11/1987 | Lecerf | ................ | F15B 13/0438 137/625.61 |
| 5,366,202 A * | 11/1994 | Lunzman | ............ | F15B 13/0402 137/625.64 |
| 5,722,460 A * | 3/1998 | Olsen | ................ | F15B 13/0402 137/625.65 |
| 6,655,654 B1 * | 12/2003 | Cotton, III | ........... | F02M 47/027 239/102.1 |
| 6,685,159 B1 * | 2/2004 | Schnell | ............... | F15B 13/0426 251/129.04 |
| 6,715,731 B1 * | 4/2004 | Post | .................... | F16K 31/006 137/554 |
| 6,739,293 B2 * | 5/2004 | Turner | .................... | F01L 9/02 123/90.11 |
| 8,082,952 B2 * | 12/2011 | Veilleux | ............. | F16K 11/0716 137/625.64 |
| 2003/0227232 A1 * | 12/2003 | Maushard | ........... | H01L 41/0926 310/328 |
| 2004/0003786 A1 * | 1/2004 | Gatecliff | .................... | F01L 9/04 123/90.11 |
| 2005/0260064 A1 * | 11/2005 | Imai | ....................... | F03B 3/183 415/24 |
| 2007/0056439 A1 * | 3/2007 | Vonderwell | ............... | E02F 9/22 91/454 |
| 2007/0075286 A1 * | 4/2007 | Tanner | .................... | F16K 11/07 251/129.06 |
| 2008/0011371 A1 * | 1/2008 | Burkhart | ............... | F16K 31/025 137/625.65 |
| 2008/0135792 A1 * | 6/2008 | Armiroli | ............... | F16K 31/005 251/129.01 |
| 2011/0030818 A1 * | 2/2011 | Huynh | .................... | F15B 13/01 137/511 |
| 2016/0369666 A1 * | 12/2016 | Hoglund | ............ | F01L 13/0036 |

FOREIGN PATENT DOCUMENTS

| | | | | |
|---|---|---|---|---|
| JP | H0366988 A | 3/1991 | | |
| JP | H04171304 A | 6/1992 | | |
| WO | WO 0159306 A1 * | 8/2001 | .......... | F15B 13/0402 |
| WO | WO 0171198 A2 * | 9/2001 | .......... | F15B 13/0426 |

* cited by examiner

HYDRAULIC SERVOVALVES

CROSS-REFERENCE TO RELATED APPLICATIONS

The present application is the U.S. national phase of International Application No. PCT/GB2014/052034 filed Jul. 3, 2014 which claims priority of British Application No. 1313804.5 filed Aug. 1, 2013, the entirety of which is incorporated herein by reference.

FIELD OF THE INVENTION

The present invention is concerned with hydraulic servovalves. More particularly, the present invention is concerned with hydraulic servovalves which are actuated by a piezoelectric element, and suitable for use in a variety of industries, including but not limited to aerospace, motorsport and industrial process control.

BACKGROUND OF THE INVENTION

Servovalves are used to magnify a relatively low power input signal (usually an electrical control signal in the order of a fraction of a Watt) to a high power hydraulic output (in the order of many thousands of Watts). Several types of hydraulic servovalves are known in the art- for example deflector jet, jet pipe and nozzle flapper. Each operates by using a pilot stage having a low power input to create a differential pressure at either end of a spool (the "main stage"). In many known applications the pilot stage is controlled by an electromagnetically driven armature, movement of which moves a small flow guide, flapper or jet pipe which in turn controls a differential pressure across a spool valve. The spool valve controls the flow of the high pressure working fluid. Servovalves typically comprise some kind of mechanical or electronic feedback system from the main stage to the pilot stage. For example, a feedback wire may extend from the spool to the armature to provide a torque opposing the electromagnetic force.

As described above, actuation of the pilot stage traditionally involved the use of an electromagnetic torque motor. Recently, piezoelectric actuation has started to emerge which offers a less complex and less expensive way of moving the flapper or flow guide of the pilot stage.

Known types of servovalves, in particular the deflector jet, jet pipe and nozzle flapper types have an intrinsic a quiescent flow whilst the valve is in the inactive or null state. In each type of valve, a proportion of the high power hydraulic flow is sent to a drain port without being used. This is undesirable as the energy in the fluid is not being used- therefore the valve loses some efficiency.

SUMMARY OF THE INVENTION

It is an aim of the present invention to provide a servovalve with a reduced quiescent flow.

According to a first aspect of the invention, there is provided servovalve comprising:
- a pilot stage comprising an electric actuator arranged to actuate a pilot stage spool valve, which pilot stage spool valve comprises an output control fluid line;
- a main stage comprising a main stage fluid valve arranged to influence the flow of a working fluid;
- in which the output control fluid line of the pilot stage spool valve is arranged to drive the main stage fluid valve to influence the flow of the working fluid.

Advantageously, the use of an electric actuator to drive a pilot spool is cost efficient, reliable and allows the pilot stage to have very low, quiescent flow in a null position (i.e. when the ports are closed, there is no differential pressure across the main stage).

Preferably the electric actuator comprises a piezoelectric element. Preferably the pilot stage spool has a pilot spool axis, and is arranged to be moved along the pilot spool axis by the piezoelectric element. Movement may occur by means of a shaft extending parallel to the pilot spool axis. Preferably the shaft is deformable in use. Advantageously, such a shaft can transmit an axial force whilst forgiving any out-of-axis movement in the piezoelectric element (which may otherwise jam the valve). The shaft may be a quill shaft arranged to transmit axial force but allow relative movement in other degrees of freedom.

Preferably the piezoelectric element is a substantially planar flat element, such as a "ring bender". Preferably the piezoelectric element is perpendicular to the pilot spool axis. Such elements move out-of-plane when an electric current is applied (or removed) and as such provide a displacement normal thereto. This results in an axially compact arrangement.

Preferably the pilot spool is connected to the centre of the piezoelectric element. This offers maximum displacement.

The piezoelectric element may be any suitable shape, such as polygonal, but preferably has a curved perimeter and may be elliptical or preferably circular. Advantageously, this reduces stress raisers in the piezoelectric material.

Preferably the piezoelectric element defines an opening in the centre thereof, and the pilot spool is connected to the piezoelectric element via a spool adaptor received in the opening. Preferably the spool adaptor clamps the piezoelectric element, for example with a nut. This allows for a straightforward attachment between the spool and the piezoelectric element.

Preferably the spool is disposed on a first side of the piezoelectric element, and the shaft extends through the opening to connect with the adaptor on a second side of the piezoelectric element. This is particularly advantageous if a flexible connection shaft is used, as it allows the assembly to be compact, but provides axial space for the shaft to deform if required.

Preferably the servovalve comprises a housing, in which the peripheral region of the piezoelectric element is clamped in the housing. More preferably the housing comprises a resilient clamping formation configured to permit deformation and/or movement of the peripheral region of the piezoelectric element. This prevents stress build-up in the piezoelectric element, and allows it to deform whilst keeping stresses low- thus prolonging reliability and service life.

Preferably the housing comprises a clamping ring urged into contact with the piezoelectric element by a resilient element. The resilient element may be a spring arranged to produce a clamping force in the order of 10-100N.

Preferably the periphery of the piezoelectric element is clamped in the housing by two nonconductive members. Advantageously, this prevents the current in the piezo material from being conducted to the housing.

Preferably the periphery of the piezoelectric element is clamped in the housing by opposing ridges having a radial width of less than 1 mm. This allows for deformation of the piezoelectric element without creating high stresses as a result of a fully constrained edge condition. The ridges allow a "pivot" at the periphery of the element.

Preferably the main stage fluid valve is a main spool, and in which the pilot stage spool valve is arranged to control the pressure at one or both ends of the main spool.

BRIEF DESCRIPTION OF THE DRAWING VIEWS

An example servovalve pilot stage in accordance with the present invention will now be described with reference to the following figures.

DETAILED DESCRIPTION OF THE INVENTION

Figure 1:
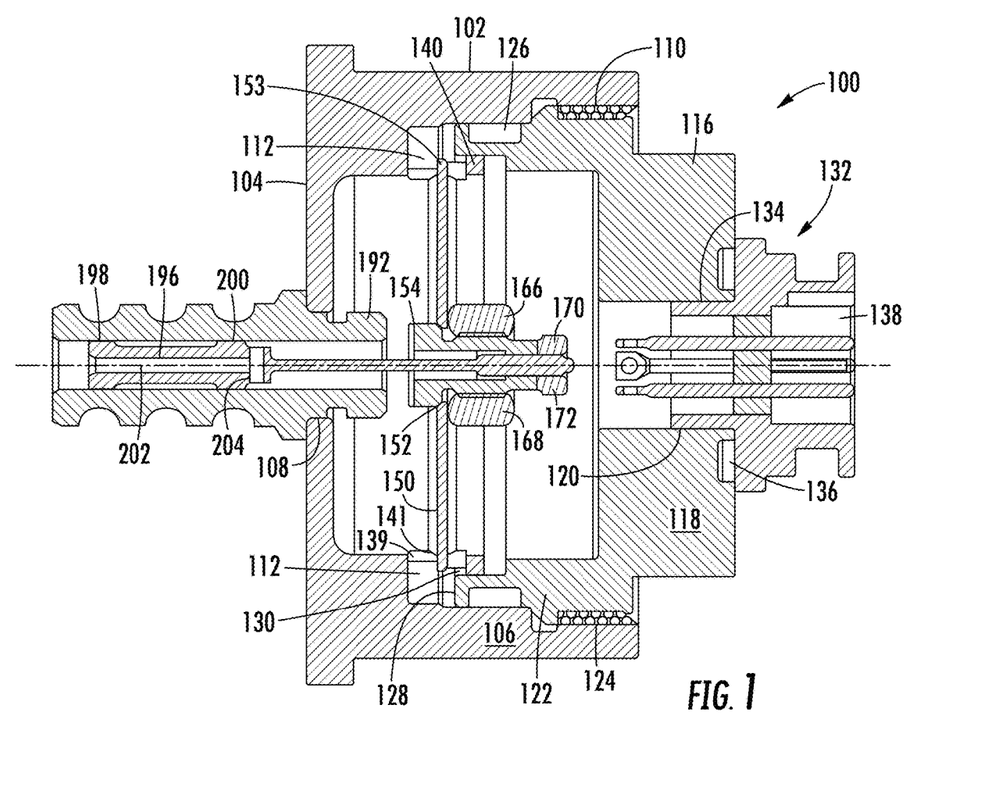
FIG. 1 is a side section view of a first servovalve pilot stage in accordance with the present invention.

Turning to FIG. 1, there is shown a servovalve pilot stage 100 in accordance with the present invention. The pilot stage 100 comprises a main axis X.

Figure 4:
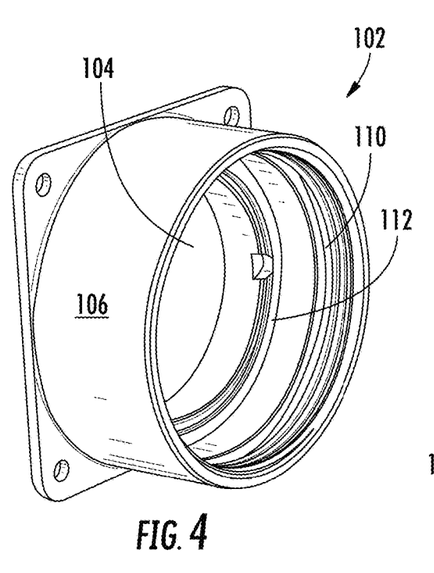
FIG. 4 is a detailed view of the housing of the servovalve pilot stage of FIG. 1.

The assembly 100 comprises a housing 102 (also shown in FIG. 4) which is generally cylindrical in configuration, having an end wall 104 and a circular cylindrical side wall 106 extending therefrom. The end wall 104 has a central coaxial bore 108 formed therein coaxial with the main axis X. At the opposite end to the end wall 104, the housing 102 is open defining a female threaded region 110. On the interior surface of the side wall 106 there is provided a first annular shoulder 112. The shoulder defines a ridge 139 which protrudes therefrom defining an annular contact region 141. Surrounding the bore 108 and on an opposite side of the end wall 104 to the side wall 106, there is provided an exterior o-ring seal (not shown) for sealing the housing 102 against the main stage assembly (not shown).

Figure 5:
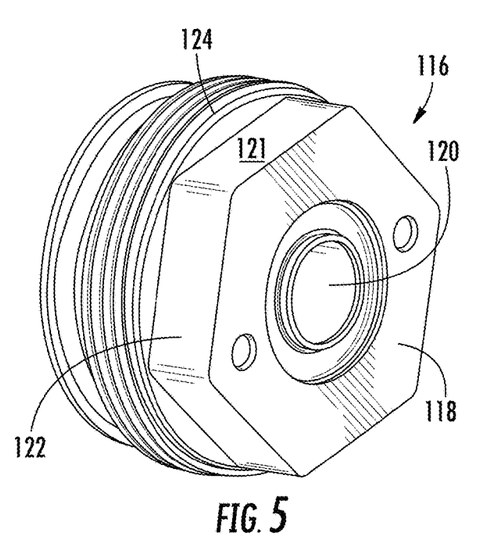
FIG. 5 is a detailed view of the cap of the servovalve pilot stage of FIG. 1.

A cap 116 is provided (also shown in FIG. 5) which is generally cylindrical in shape having an end region 118 with a circular open bore 120 and a hexagonal outer profile 121. The cap 116 defines a side wall 122 extending from the end wall 118 and being generally hollow and cylindrical. The side wall 122 defines a male thread 124 on its outer surface proximate the end wall 118. An o-ring groove 126 is provided proximate an annular end surface 128 of the side wall 122. The annular end surface 128 defines a clamping ring recess 130 on the inner surface thereof.

An electrical connector 132 is provided, being generally cylindrical in shape and having a male portion 134 and a shoulder 136. The electrical connector 132 has a bore 138 extending therethrough. Electrical pins are sealed by a glass pellet providing an hermetic barrier. An O ring is employed in the groove adjacent the shoulder 136 to retain a low pressure fluid within the chamber surrounding the ring bender 150.

Figure 7:
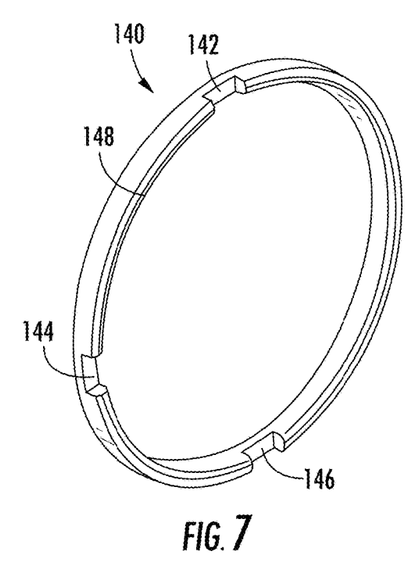
FIG. 7 is a detailed view of the clamping ring of the servovalve pilot stage of FIG. 1.

A clamping ring 140 (shown in detail in FIG. 7) is provided which is also generally annular and ring-like in shape. The clamping ring 140 comprises three discrete slots 142, 144, 146, the first and second slot 142, 144 being spaced 90 degrees apart and the second and third slots 144, 146 being spaced 90 degrees apart, such that the third and first slots 146 and 142 are spaced 180 degrees apart. The clamping ring 140 defines a tapered region leading to an annular end surface 148 of less radial thickness than the main part of the ring 140.

A piezoelectric ring bender 150 is provided which is a circular flat piezoelectric element having a central bore 152 and a periphery 153. The ring bender is about 30 mm in diameter with a 6 mm diameter bore and is and 0.7 mm thick, The ring bender is flat in its unenergised state, and can assume the deformed shapes shown in hidden line in FIG. 2.

Figure 8:
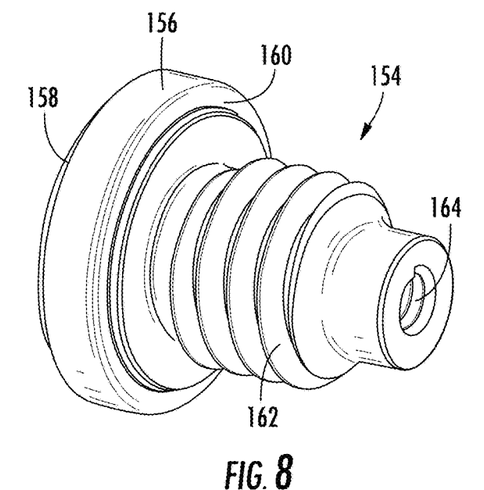
FIG. 8 is a detailed view of the spool adaptor of the servovalve pilot stage of FIG. 1.

A spool adaptor 154 is provided and is shown in detail in FIG. 8. The spool adaptor 154 comprises a flange 156 having an end face 158 and an annular shoulder 160 opposite thereto. Extending from the shoulder 160 there is provided a threaded shaft 162 having a male thread defined thereon. The spool adaptor 154 further comprises a open threaded bore 164 concentric with the male threaded shaft 162.

A spool adaptor nut 166 is provided having a female threaded bore 168. A spool backlash adaptor locknut 170 is provided having a female threaded bore 172.

Figure 3:
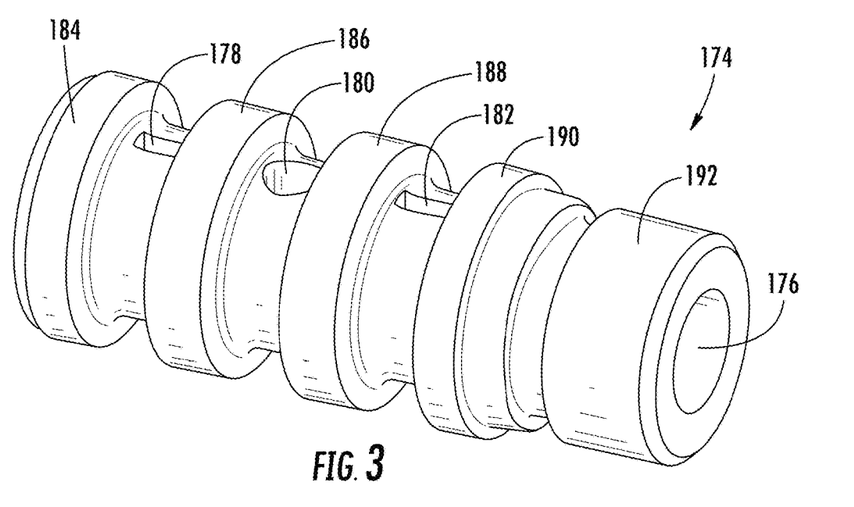
FIG. 3 is a detailed view of the bushing of the servovalve pilot stage of FIG. 1.

A bushing 174 is provided which is generally cylindrical in shape and can be seen in detail in FIG. 3. The bushing 174 has an interior open 176 extending therethrough. In addition, the bushing 174 defines four radially extending flow passages 178, 180, 182 (only three are visible) in communication with the bore 176. The bushing is configured to act in conjunction with a spool (as will be described below) as a 4/3 directional control valve (4 ports, 3 positions).

On its exterior surface and inbetween each of the flow passages 178, 180, 182 the bushing 174 defines a plurality of annular lands 184, 186, 188, 190. At the axial end of the bushing 174 there is provided a threaded shaft 192.

Figure 6:
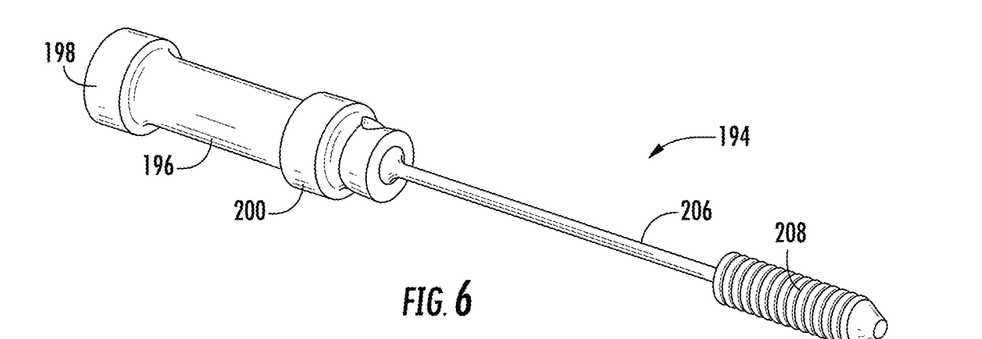
FIG. 6 is a detailed view of the spool of the servovalve pilot stage of FIG. 1.

The assembly 100 further comprises a spool subassembly 194 as shown in detail in FIG. 6. The spool subassembly 194 comprises a spool body 196 which is generally cylindrical having a first annular land 198 defined proximate a first end and a second annular land 200 defined proximate a second, opposite, end. The spool body 196 is relatively small (in the order of 3.8 mm diameter). The spool body 196 has a central bore 202 connected to a vent 204, the bore 202 being open at the end proximate the first annular land 198. A quill shaft 206 is provided extending from the end of the spool body 196 proximate the second land 200, the quill shaft being an elongate, flexible thin shaft terminating in a threaded head 208.

The pilot stage assembly 100 is assembled as follows, and in particular with reference to FIGS. 1 and 2.

Figure 2:
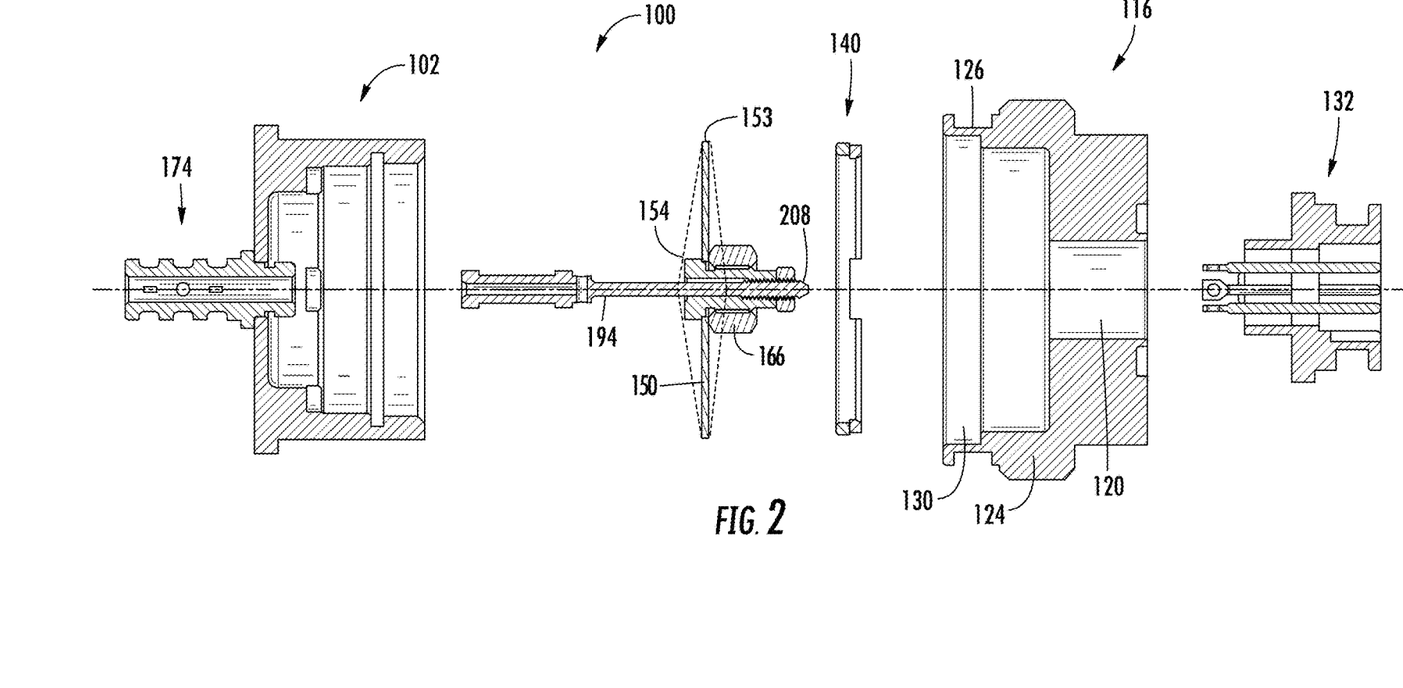
FIG. 2 is an exploded side section view of the servovalve pilot stage of FIG. 1.

The bushing 174 is inserted into the bore 108 of the housing 102 as shown in FIG. 2. The bushing 174 is secured thereto with the use of a nut threaded onto and engaged with the male threaded shaft 192 from the opposite side of the housing sidewall 104. The nut is not visible in the appended drawings, however, it will be understood that it serves to attach the bushing 174 to the housing 102.

Moving to the right in FIG. 2, the ring bender 150 is engaged with the shaft 162 of the spool adaptor 154 such that it abuts the shoulder 160. The spool adaptor nut 166 is then threaded onto the shaft 162 such that the ring bender 150 is clamped between the nut 166 and the adaptor 154. The quill shaft 206 of the spool 194 is then engaged into the adaptor 154 such that the threaded head 208 is engaged with the female thread 164 of the spool adaptor 154. The position of the spool 194 in the null position can be calibrated by rotating it within the adaptor 154 (which will result in axial adjustment). As can be seen in FIGS. 1 and 2, the head 208 projects from the end of the adaptor 154 and the spool backlash locknut 170 is secured on the head 208 and tightened against the adaptor 154 to remove any backlash between cooperating threads of the head 208 and the adaptor 154. The locknut also prevents the shaft 162 unscrewing from the adapter 154 which would shift the hydraulic null of the spool 194.

The assembly of the ring bender 150, spool adaptor 154, nut 166, spool subassembly 194 and backlash locknut 170 is then placed within the housing 102 such that the spool valve body 196 sits within the bore of the bushing 174 to create a 4/3 directional control valve. The periphery 153 of the ring bender 150 abuts the annular end surface 141 of the ridge 139. The clamping ring 140 is then inserted to sit on the opposite side of the ring bender 150 to the ridge 139. An annular wave spring (not visible) is also inserted to bear against the second clamping ring 140 and following this, the cap 116 is threaded into the female thread 110 of the housing 102 to clamp the ring bender 150 between the ridge 139 and the second clamping ring 141 under the resilient force of the wave spring to hold it in place proximate its periphery. The clamping force of the wave spring is in the region of 9-12 lbf (40-53N). The ridge 139 and the clamping ring 140 also lock the ring bender 150 in a rotational sense (due to friction), and do not permit rotation about the axis X (which could cause rotation of the spool in use).

The electrical connector 132 is then connected to the bore 120 of the cap 116.

During operation, if a controller wishes to operate the pilot stage spool 194 then a voltage is applied to the ring bender 150. This voltage causes the ring bender 150 to deform to assume one of the shapes shown in hidden line in FIG. 2, during which deformation, the adaptor 154 is moved axially along axis X. This movement is transferred through the spool adaptor 154. The spool body 196 then moves axially to control the flow in and out of the ports formed in the bushing 174. The movement of the spool 194 is fully proportional- that is it can adopt a continuous range of positions to vary the flow through the bushing 174.

Figure 9:
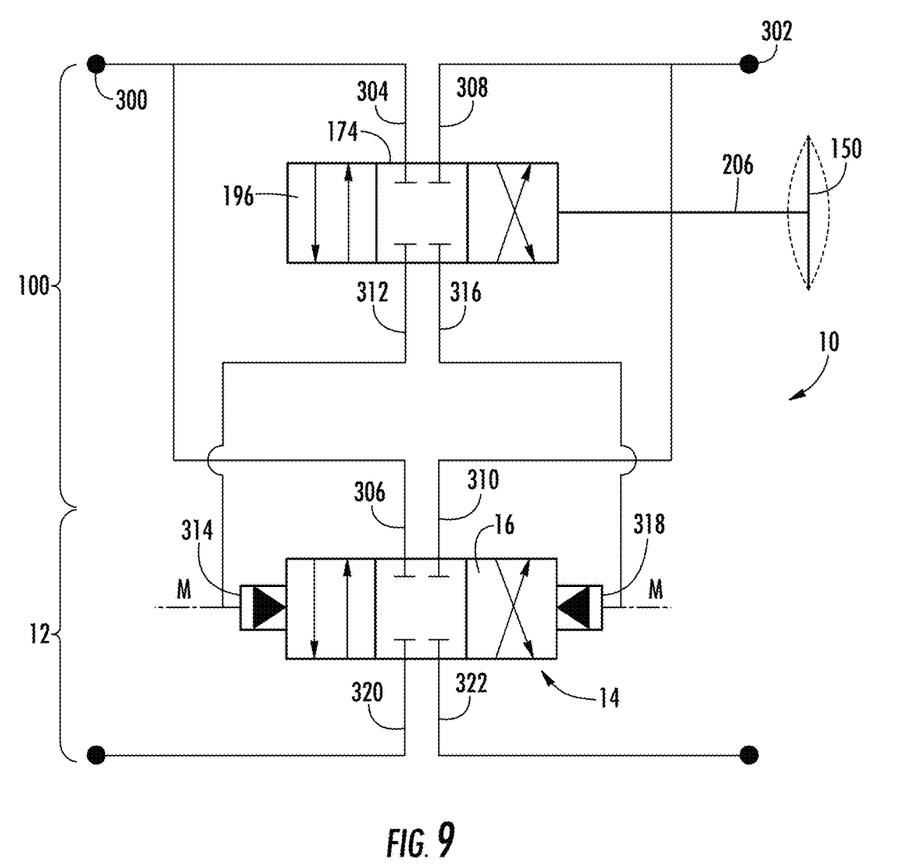
FIG. 9 is a hydraulic circuit diagram of a servovalve comprising the pilot stage of FIG. 1.

Turning to FIG. 9, a schematic system diagram of a servovalve 10 is shown, comprising a pilot stage 100 as described above.

The servovalve 10 further comprises a main stage 12 comprising a main stage spool valve 14. The main stage spool valve 14 comprises a spool body 16 which is actuated along a main stage axis M by differential pressure on either end thereof.

The servovalve comprises a supply port 300 and a return port 302 for the connection of a supply pressure (at 3000 or 5000 psi gauge pressure- 20.7 MPa or 34.5 MPa) and a drain respectively.

The supply port 300 is in fluid communication with (i) a first valve port 304 in the bushing 174 and (ii) a first valve port 306 in the main stage spool valve 14. Similarly the return port 302 is in fluid communication with (i) a second valve port 308 in the bushing 174 and (ii) a second valve port 310 in the main stage spool valve 14.

A third valve port 312 in the bushing 174 is in fluid communication with a first end 314 of the spool 16. A fourth valve port 316 in the bushing 174 is in fluid communication with a second end 318 of the spool 16.

A third and fourth valve ports 320, 322 of the main stage spool 16 are in fluid communication with an actuator or similar (these are the control ports).

In use, the ring bender 150 can move the pilot stage spool 196 between the three illustrated conditions- i.e.:
(i) First port 304 in communication with third port 312, second port 308 in communication with fourth port 316.
(ii) No flow.
(iii) First port 304 in communication with fourth port 316, second port 308 in communication with third port 312.

As such, in condition (i), pressure from the supply 300 is applied to the first end 314 of the spool 16. Because the second end 318 is connected to the return 302, the spool 16 moves to the right and thus supplying supply pressure 300 via port 306 to port 320. Similarly the return 302 is connected via port 308 to port 322.

In condition (ii), the pressure on either side of the spool 16 is equalised.

In condition (iii) pressure from the supply 300 is applied to the second end 318 of the spool 16. Because the first end 314 is connected to the return 302, the spool 16 moves to the left and thus supplying supply pressure 300 via port 306 to port 322. Similarly the return 302 is connected via port 310 to port 320.

Because the ring bender 150 can be deformed by varying amounts based on the electrical input voltage, the spool 196 can vary the flow rates in conditions (i) and (iii) as required.

The spool 16 is significantly larger than the spool valve 196 and as such could not be moved by the ring bender 150 alone. Therefore the above-described arrangement allows a small ring bender 150 requiring a small electric power input to control a significant flow through the main stage 12.

Figure 10:
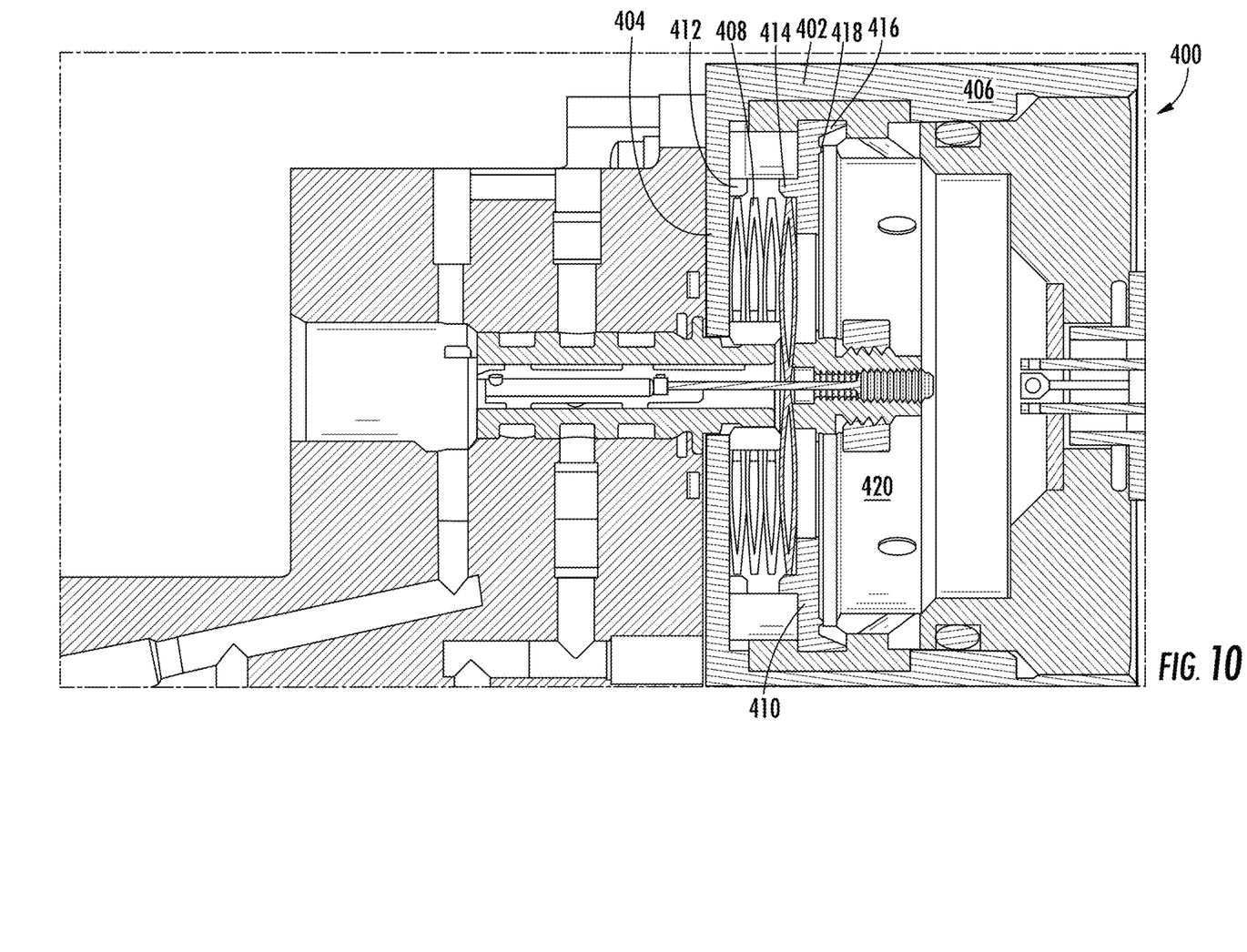
FIG. 10 is a side section view of a second servovalve pilot stage in accordance with the present invention; and, FIG. 11 is a side section view of the servovalve pilot stage of FIG. 10.
Figure 11:
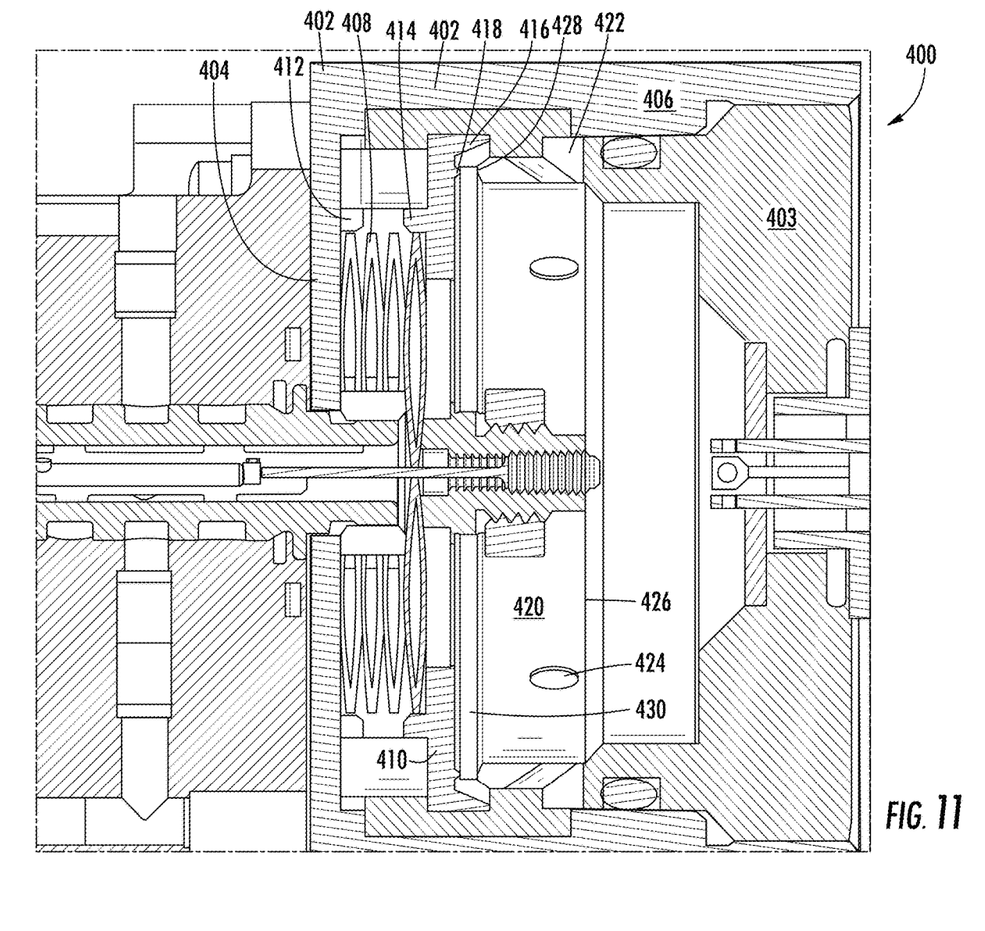

Turning to FIGS. 10 and 11, a second servovalve pilot stage 400 is shown, similar in many respects to the pilot stage 100. The construction and operation of the pilot stage 400 is the same as the pilot stage 100 with the following exceptions.

A housing 402 comprises an endwall 404 and a cylindrical sidewall 406. A first annular endstop 412 projects from the endwall 404.

A first clamping ring 410 is provided having a second annular endstop 414 on a first side, and an annular ring bender shroud 416 on a second side. An annular ridge 418 is provided concentric with, and radially inwardly of, the shroud 416.

A compression spring 408 is disposed between the interior side of the endwall 404 and a first clamping ring 410. Contact of the annular endstops 412, 414 limits the compression of the spring 408 between the housing 402 and the ring 410.

A second clamping ring 420 is provided, and is secured in place by a cap 403 (which is similar to the cap 116). The second clamping ring 420 is hollow and cylindrical having a sidewall 422 defining a plurality of radial openings 424, and an endwall 426. The second clamping ring 420 defines an annular ridge 428 at the annular end of the sidewall 422 opposite the endwall 426.

The ridges 418, 428 are of the same diameter and define "blunt knife-edges" of 0.15 mm radial width.

A piezoelectric element in the form of a ring bender 430 is provided, similar to the ring bender 150, and in use is clamped between the ridges 418, 428 of the respective clamping rings 410, 420. The circular line contact provided by the ridges allows the bender 430 to deform without creating significant strain. The spring 408 provides the clamping force onto the bender 430 of 9-12 lbf (40-53N).

The present invention can operate with a variety of capacities of the pilot and main stage spools. The pilot stage spool may be 18 mm long, with a diameter of 3.8 mm. A typical equivalent orifice diameter (EOD) of the pilot stage would be in the order of 0.254 mm with a flow rate of around $6.56 \times 10^{-6}$ m$^3$/s.

In the same servovalve, the main stage spool would be 56 mm long with a diameter of 8.3 mm. A typical EOD of the main stage would be in the order of 3.3 mm with a flow rate of around $1.31 \times 10^{-3}$ m$^3$/s.

The above ratio of pilot to main stage flow is about 1:200. In general the pilot stage to main stage flow ratio is in the order of 1:10 to 1:400, although 1:20 to 1:200 is optimal.

Variations fall within the scope of the present invention.

Instead of a piezoelectric element 150, the pilot stage spool 196 may be driven by a linear force motor, or any electrically driven actuator that requires a small input power.

Instead of a pair of relatively stiff rings and a spring, the ring bender 150 could be clamped between a pair of compliant elastomeric rings, which would provide the required clamping force and deformability with one less component.

What is claimed is:

1. A hydraulic servovalve comprising:
   a pilot stage comprising an electric actuator arranged to actuate a pilot stage spool valve along a pilot spool axis, which pilot stage spool valve comprises:
   an output control fluid line;
   a bushing having a plurality of flow passages and an opening extending along the pilot spool axis;
   a spool body received and axially movable within the opening of the bushing to control flow in and out of the flow passages in the bushing, wherein axially directed motion of the spool body is unrestricted by the bushing;
   in which the spool body is connected to the electric actuator by a shaft extending parallel to or coaxial with the pilot spool axis and the spool body is arranged to be moved relative to the bushing, along the pilot spool axis, by the electric actuator; and
   in which the shaft is connected to the electric actuator via a spool adaptor such that a position of the spool body within the bushing can be calibrated by rotating the shaft within the adaptor;
   a main stage comprising a proportional main stage fluid spool valve arranged to influence the flow of a working fluid;
   in which the output control fluid line of the pilot stage spool valve is arranged to drive the main stage fluid valve to continuously vary the flow of the working fluid.

2. A servovalve according to claim 1, in which the electric actuator comprises a piezoelectric element.

3. A servovalve according to claim 2, in which the piezoelectric element is a substantially planar flat element.

4. A servovalve according to claim 3, in which the piezoelectric element is perpendicular to the pilot spool axis.

5. A servovalve according to claim 4, in which the pilot stage spool valve is connected to the center of the piezoelectric element.

6. A servovalve according to claim 3, in which the piezoelectric element is circular.

7. A servovalve according to claim 3, in which the piezoelectric element defines an opening in the center thereof.

8. A servovalve according to claim 7, in which the spool adaptor is received in the opening of the piezoelectric element.

9. A servovalve according to claim 8, in which the spool adaptor clamps the piezoelectric element.

10. A servovalve according to claim 8, in which the shaft is flexible in use.

11. A servovalve according to claim 10, in which the pilot stage spool valve is disposed on a first side of the piezoelectric element, and the shaft extends through the opening of the piezoelectric element to connect with the spool adaptor on a second side of the piezoelectric element.

12. A servovalve according to claim 2, comprising a housing, in which a peripheral region of the piezoelectric element is clamped in the housing.

13. A servovalve according to claim 12, in which the housing comprises a resilient clamping formation configured to permit deformation and/or movement of the peripheral region of the piezoelectric element.

14. A servovalve according to claim 13, in which the housing comprises a clamping ring urged into contact with the piezoelectric element by a resilient element.

15. A servovalve according to claim 12, in which the periphery of the piezoelectric element is clamped in the housing by two nonconductive members.

16. A servovalve according to claim 12, in which the periphery of the piezoelectric element is clamped in the housing by opposing ridges having a radial width of less than 1 mm.

17. A servovalve according to claim 1, in which the main stage fluid spool valve comprises a main spool, and in which the pilot stage spool valve is arranged to control the pressure at one or both ends of the main spool.

18. A hydraulic servovalve comprising:
    a pilot stage comprising an electric actuator arranged to actuate a pilot stage spool valve along a pilot spool axis, which pilot stage spool valve comprises an output control fluid line;
    a main stage comprising a proportional main stage fluid spool valve arranged to influence the flow of a working fluid;
    in which the output control fluid line of the pilot stage spool valve is arranged to drive the main stage fluid spool valve to continuously vary the flow of the working fluid,
    wherein the electric actuator comprises a piezoelectric element, the piezoelectric element being transferrable between a first position in which the piezoelectric element is undeformed, a second position in which the piezoelectric element is deformed relative to the first position in a first direction, and a third position in which the piezoelectric element is deformed relative to the first position in a second direction opposite to the first direction, and
    wherein the pilot stage comprises a clamping ring urged into contact with the piezoelectric element by a resilient element, the clamping ring comprising a plurality of slots for locking the piezoelectric element in a rotational sense.

19. A hydraulic servovalve of claim 18, wherein the piezoelectric element can be deformed by varying amounts based on an electrical input voltage, between the second and third positions.

* * * * *